Mar. 27, 1923.
R. D. SMITH.
MOLD.
FILED NOV. 17, 1921.
1,449,789.
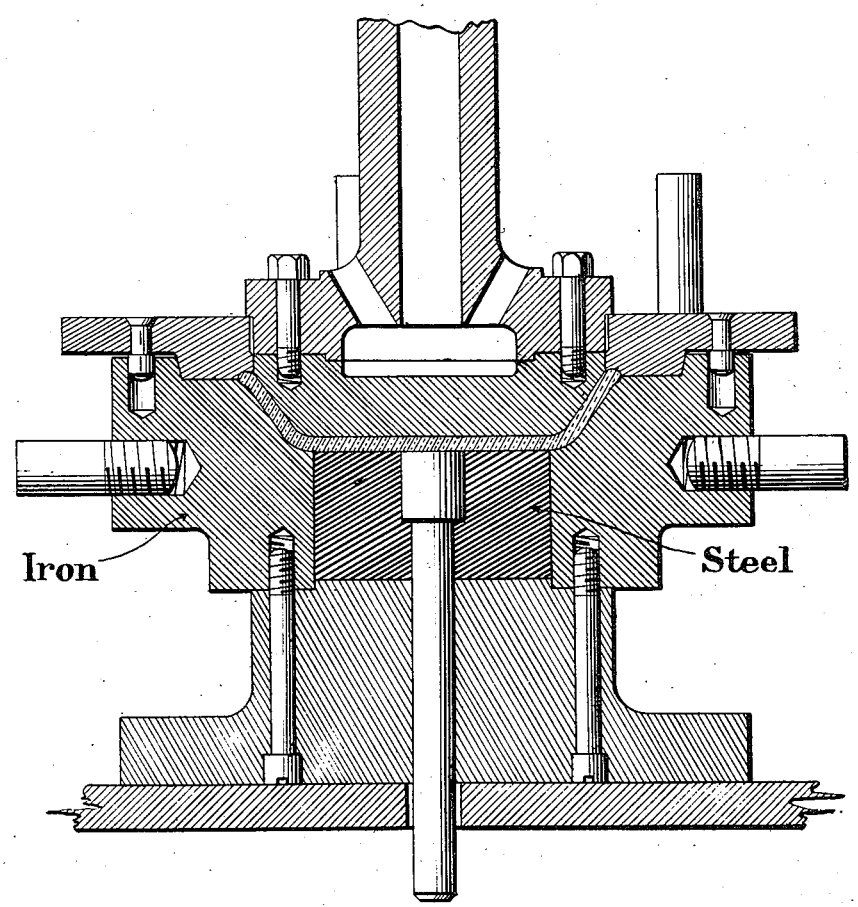
Rowland D. Smith
INVENTOR
BY
ATTORNEY Patented Mar. 27, 1923.

1,449,789

UNITED STATES PATENT OFFICE.

ROWLAND D. SMITH, OF CORNING, NEW YORK, ASSIGNOR TO CORNING GLASS WORKS, OF CORNING, NEW YORK, A CORPORATION OF NEW YORK.

MOLD.

Application filed November 17, 1921. Serial No. 515,892.

*To all whom it may concern:*

Be it known that I, ROWLAND D. SMITH, a citizen of the United States of America, and a resident of Corning, New York, have invented certain new and useful Improvements in Molds, of which the following is a specification.

One of the most frequent causes of the destruction of molds or molding parts (including plungers, valves, etc.) used in the manufacture of glassware, is the checking or cracking of the surface of such parts. This is particularly marked, when in such parts, are used glasses that require to be pressed at a comparatively high temperature. With a certain glass with which I have worked, the amount of deterioration from this cause is shown by the fact that a chilled gray cast iron mold part failed by checking and had to be discarded after sixty hours of service, while an unchilled gray cast iron mold part failed from the same cause after a 120 hours' service.

Inasmuch as these mold parts have to be accurately formed, finished and polished, this early failure renders the cost of articles produced by such parts excessive, and this invention has for its object to provide a material from which such parts should be fabricated, which will give a much longer life.

I have found that chromium cobalt, chromium silicon, or chromium steels, are especially suitable for the purpose had in mind, and the following are the compositions of three steels falling within this invention:—

|  | A | B | C |
|---|---|---|---|
| Chromium | 13.6% | 10 to 15% | 8 to 13% |
| Cobalt | .6% | 2 to 5% | --- |
| Carbon | .35 to .40% | .8 to 1.5% | .5% |
| Manganese | .5% | --- | .5% |
| Molybdenum | --- | --- | --- |
| Silicon | --- | 1% | 4% |
| Iron | 86.5% | 83% | 84% |

The steels of A and C are forging steels, and to that extent are difficult to work. They, however, give about twenty times the length of service of chilled iron. Composition B is capable of being cast, and to that extent is more desirable for certain purposes than compositions A or C.

I have in the accompanying drawing shown a valve such as used in glass molds embodying this invention, and which can be made from either of the compositions above given.

Having thus described my invention what I claim as new and desire to secure by Letters Patent is:—

1. A part for molding glassware made of a steel containing from 10 to 15% chromium, and from ½% to 5% cobalt.

2. A part for molding glassware made of steel containing about 13% chromium, about ½% manganese, about 6/10ths% cobalt, and of about .35% of carbon.

3. A part for molding glassware made of steel containing chromium and about 4% silicon.

In testimony whereof I hereunto sign my name this 16th day of November 1921.

ROWLAND D. SMITH.